United States Patent
Piecko (10) Patent No.: US 11,436,225 B2
(45) Date of Patent: *Sep. 6, 2022

(54) DATABASE HIERARCHY-INDEPENDENT DATA DRILLING

(71) Applicant: DataWalk Spólka Akcyjna, Wroclaw (PL)

(72) Inventor: Krystian Piecko, Wroclaw (PL)

(73) Assignee: DATAWALK SPOLKA AKCYJNA, Wroclaw (PL)

( * ) Notice: Subject to any disclaimer, the term of this patent is extended or adjusted under 35 U.S.C. 154(b) by 245 days.

This patent is subject to a terminal disclaimer.

(21) Appl. No.: 16/269,268

(22) Filed: Feb. 6, 2019

(65) Prior Publication Data

US 2019/0243834 A1 Aug. 8, 2019

Related U.S. Application Data

(63) Continuation of application No. 14/315,481, filed on Jun. 26, 2014, now Pat. No. 10,242,056.

(30) Foreign Application Priority Data

Jun. 30, 2013 (PL) .............................. EP13461536.8

(51) Int. Cl.
*G06F 16/26* (2019.01)
*G06F 16/2453* (2019.01)

(52) U.S. Cl.
CPC ........ *G06F 16/24544* (2019.01); *G06F 16/26* (2019.01)

(58) Field of Classification Search
None
See application file for complete search history.

(56) References Cited

U.S. PATENT DOCUMENTS 5,257,349 A 10/1993 Alexander
5,418,961 A 5/1995 Segal et al.
(Continued)

FOREIGN PATENT DOCUMENTS

EP 0592046 A2 4/1994
EP 2455869 A1 * 5/2012 ....... G06F 16/24526
(Continued)

OTHER PUBLICATIONS

Lin Guo; XRank: Ranked Keyword Search over XML Documents; ACM; 2003; pp. 16-27 (Year: 2003).*
(Continued)

*Primary Examiner* — Amresh Singh
*Assistant Examiner* — Jermaine A Mincey
(74) *Attorney, Agent, or Firm* — Wilson Sonsini Goodrich & Rosati (57) ABSTRACT

Computer implemented methods for database hierarchy-independent data drilling are presented including: a. selecting one of at least two database structures each having data, where the at least two database structures include, at least two distinct paths that lead from a first of the at least two database structures to a second of the at least two database structures, where a path logically relates at least two data structures which are otherwise directly unrelated using data structures and data structures' relations, and a database information schema that provides information about the at least two database structures including information regarding relations between data structures; b. setting the selected database structure as a current data drilling state; and c. finding at least one related data structure corresponding with the selected database structure for the current data drilling state utilizing the database information schema.

12 Claims, 7 Drawing Sheets

(56) References Cited

U.S. PATENT DOCUMENTS

| | | | |
|---|---|---|---|
| 5,548,758 | A | 8/1996 | Pirahesh et al. |
| 5,604,899 | A | 2/1997 | Doktor |
| 6,038,566 | A | 3/2000 | Tsai |
| 6,105,035 | A | 8/2000 | Monge et al. |
| 6,163,775 | A | 12/2000 | Wlaschin et al. |
| 6,192,371 | B1 | 2/2001 | Schultz |
| 6,934,712 | B2 | 8/2005 | Kiernan et al. |
| 6,947,945 | B1 | 9/2005 | Carey et al. |
| 6,986,102 | B1 | 1/2006 | Baer et al. |
| 7,058,622 | B1 | 6/2006 | Tedesco |
| 7,243,106 | B2* | 7/2007 | Vierich ............... G06F 16/2264 |
| 7,363,593 | B1 | 4/2008 | Loyens et al. |
| 7,895,191 | B2 | 2/2011 | Colossi et al. |
| 8,103,703 | B1 | 1/2012 | Jetter et al. |
| 8,224,829 | B2 | 7/2012 | Pauly |
| 8,364,623 | B1 | 1/2013 | Bunker et al. |
| 8,386,920 | B2 | 2/2013 | Cox et al. |
| 8,793,246 | B1 | 7/2014 | Mathur et al. |
| 8,874,621 | B1 | 10/2014 | Goodwin et al. |
| 9,218,380 | B2 | 12/2015 | Adzic et al. |
| 9,483,508 | B1 | 11/2016 | Wilkes et al. |
| 9,747,312 | B2 | 8/2017 | Piecko |
| 10,002,143 | B2 | 6/2018 | Piecko et al. |
| 10,095,743 | B2 | 10/2018 | Piecko |
| 11,138,162 | B2 | 10/2021 | Piecko |
| 2001/0051948 | A1 | 12/2001 | Srinivasan et al. |
| 2002/0029209 | A1 | 3/2002 | Bernal et al. |
| 2003/0088545 | A1 | 5/2003 | Subramaniam et al. |
| 2003/0208493 | A1 | 11/2003 | Hall et al. |
| 2003/0229640 | A1 | 12/2003 | Carlson et al. |
| 2004/0088283 | A1 | 5/2004 | Lissar et al. |
| 2004/0133581 | A1* | 7/2004 | Shinjo ............... G06F 16/258 |
| 2004/0139102 | A1 | 7/2004 | Vierich et al. |
| 2004/0255301 | A1 | 12/2004 | Turski et al. |
| 2005/0039033 | A1 | 2/2005 | Meyers et al. |
| 2005/0216503 | A1 | 9/2005 | Charlot et al. |
| 2005/0228818 | A1 | 10/2005 | Murthy et al. |
| 2006/0173841 | A1 | 8/2006 | Bill |
| 2006/0288035 | A1 | 12/2006 | Viavant |
| 2007/0027860 | A1* | 2/2007 | Bestgen ............ G06F 16/24524 |
| 2007/0112803 | A1 | 5/2007 | Pettovello |
| 2007/0198557 | A1 | 8/2007 | Ching et al. |
| 2008/0021864 | A1* | 1/2008 | Bakalash ............... G06F 16/30 |
| 2008/0033987 | A1 | 2/2008 | Carter |
| 2008/0183658 | A1 | 7/2008 | Mangipudi |
| 2008/0301181 | A1 | 12/2008 | Lori |
| 2009/0103715 | A1 | 4/2009 | Thorbjornsson |
| 2009/0222408 | A1 | 9/2009 | Charles et al. |
| 2010/0287212 | A1 | 11/2010 | Becker |
| 2010/0299348 | A1 | 11/2010 | Gill et al. |
| 2011/0231438 | A1 | 9/2011 | Pfeifle et al. |
| 2012/0096002 | A1 | 4/2012 | Sheehan et al. |
| 2012/0117027 | A1 | 5/2012 | Shau et al. |
| 2012/0246147 | A1 | 9/2012 | Lamb et al. |
| 2012/0284635 | A1 | 11/2012 | Sitrick et al. |
| 2013/0083104 | A1 | 4/2013 | Mitsuki |
| 2013/0086104 | A1 | 4/2013 | Morrison et al. |
| 2013/0091180 | A1 | 4/2013 | Vicat-Blanc-Primet et al. |
| 2013/0144917 | A1 | 6/2013 | Hosurmath et al. |
| 2013/0307843 | A1 | 11/2013 | Sikka et al. |
| 2013/0311518 | A1 | 11/2013 | Agbaria |
| 2014/0046983 | A1 | 2/2014 | Galloway et al. |
| 2014/0297693 | A1 | 10/2014 | Piecko |
| 2014/0324874 | A1* | 10/2014 | Konik ............... G06F 16/2379 707/741 |
| 2015/0006507 | A1 | 1/2015 | Piecko |
| 2018/0018357 | A1 | 1/2018 | Piecko |
| 2018/0203884 | A1 | 7/2018 | Piecko |
| 2019/0042624 | A1 | 2/2019 | Piecko |

FOREIGN PATENT DOCUMENTS

| | | |
|---|---|---|
| WO | WO-02059793 A3 | 4/2003 |
| WO | WO-2017186774 A1 | 11/2017 |

OTHER PUBLICATIONS

Anonymous: II sql—Relational database design question—Surrogate-key or Natural-key?—Stack Overflow, Sep. 19, 2010 (Sep. 19, 2010), XP055109921, Retrieved from the Internet: URL:http://stackoverflow.com/questions/3747730/relational-database-design-question-surrogate-key-or-natural-key [retrieved on Mar. 25, 2014] "see answer from Mitch Dempsey".

Co-pending U.S. Appl. No. 16/167,333, filed Oct. 22, 2018.

European Patent Office Search Report; RE. Application No. 13461516.0 Report dated Jul. 30, 2013.

European Patent Office Search Report; RE. Application No. 13461536.8 Report dated Sep. 10, 2013.

European Patent Office Search Report; RE. Application No. 13461545.9 Report dated Apr. 25, 2014.

European Patent Office Search Report; RE. Application No. 13461546.7 Report dated Apr. 11, 2014.

European Search Report dated Feb. 16, 2017 for European Patent Application No. EP16197450.6.

European Search Report dated May 18, 2017 for European Patent Application No. 16203912.7.

Girvan et al. Community structure in social and biological networks. Proc Natl Acad Sci U S A. Jun. 11, 2002; 99(12): 7821-7826.

Notice of Allowance dated Apr. 10, 2017 for U.S. Appl. No. 14/469,968.

Notice of Allowance dated Apr. 28, 2017 for U.S. Appl. No. 14/469,968.

Notice of Allowance dated Jul. 26, 2017 for U.S. Appl. No. 14/469,968.

Notice of Allowance dated Dec. 19, 2017 for U.S. Appl. No. 14/222,795.

Office action dated Feb. 11, 2016 for U.S. Appl. No. 14/222,795.

Office Action dated Mar. 13, 2017 for U.S. Appl. No. 14/315,481.

Office Action dated Apr. 28, 2017 for U.S. Appl. No. 14/222,795.

Office Action dated May 26, 2017 for U.S. Appl. No. 14/469,958.

Office action dated Jun. 2, 2016 for U.S. Appl. No. 14/222,795.

Office Action dated Jul. 3, 2017 for U.S. Appl. No. 14/315,481.

Office action dated Aug. 22, 2016 for U.S. Appl. No. 14/315,481.

Office action dated Aug. 26, 2016 for U.S. Appl. No. 14/469,968.

Office action dated Sep. 12, 2016 for U.S. Appl. No. 14/469,958.

Office Action dated Sep. 22, 2016 for U.S. Appl. No. 14/222,795.

Office Action dated Dec. 21, 2016 for U.S. Appl. No. 14/469,968.

Office Action dated Dec. 22, 2017 for U.S. Appl. No. 14/469,958.

PCT/EP2017/059892 International Search Report and Written Opinion dated May 30, 2017.

U.S. Appl. No. 14/222,795 Notice of Allowance dated Jan. 29, 2018.

U.S. Appl. No. 14/315,481 Notice of Allowance dated Nov. 28, 2018.

U.S. Appl. No. 14/315,481 Office Action dated May 17, 2018.

U.S. Appl. No. 14/469,958 Notice of Allowance dated Jun. 29, 2018.

Non-Final Office Action issued in U.S. Appl. No. 16/058,025 dated Nov. 19, 2021.

Notice of Allowance issued in U.S. Appl. No. 16/847,202 dated Oct. 26, 2021.

* cited by examiner

DATABASE HIERARCHY-INDEPENDENT DATA DRILLING

RELATED APPLICATIONS

This application is a continuation of U.S. patent application Ser. No. 14/315,481, filed Jun. 26, 2014, which claims the benefit of priority under 35 U.S.C. 119(a), (b) of European Patent Application No. EP13461536.8, filed Jun. 30, 2013, each of which applications is entirely incorporated herein by reference.

TECHNICAL FIELD

The disclosure is related to computer-implemented methods for database data drilling independent of any given hierarchy of a particular database.

BACKGROUND

Since the first relational database model has appeared, data mining and knowledge management were considered to be the biggest challenges in data processing. Data mining may be addressed by data drilling (data retrieval in a sophisticated way), which refers to any of various operations and transformations on tabular, relational, and multidimensional data. The term is commonly (according to WIKIPEDIA) associated with specialized software designed specifically for data analysis. Efficiency of data drilling becomes a crucial problem nowadays, when database systems are so complex that it may be almost impossible to be aware of a full logical database structure.

A typical database may contain hundreds and more commonly even thousands of data structures (e.g. tables). Such data structures usually relate to other structures in multiple ways by means of so-called relations. If users wish to execute database queries on such complex databases, they need to design a special, tailored query, which may be usually complex and require a long time to process by a computing machine. If the obtained result of such query does not reflect exactly the aim of the intention of the query designer, the queries may have to be performed again, which may be very costly in terms of time and required trial and error cycles.

Inherently, data drilling may be tightly bound to using complex JOIN type database queries.

JOIN type queries are commonly (according to WIKIPEDIA) defined in the prior art as follows. An SQL join clause combines records from two or more tables in a database. It creates a set that can be saved as a table or used as it is. The JOIN clause may be a means for combining fields from two tables by using values common to each. ANSI standard SQL specifies four types of JOIN: INNER, OUTER, LEFT, and RIGHT. As a special case, a table (base table, view, or joined table) can JOIN to itself in a self-join.

A programmer writes a JOIN predicate to identify the records for joining. If the evaluated predicate may be true, the combined record may be then produced in the expected format, a record set or a temporary tables mechanism that provides a way to organize data derived from queries into new tables, which can themselves be queried repeatedly.

Present relational databases are often normalized in order to eliminate duplication of information when objects may have one-to-many, one-to-one or many-to-many relationships. The aims of normalization are: to store only the minimal amount of information, to remove redundancies in the data, to remove anomalies, and to restructure data in order to provide more efficient storage. For example, in a database storing human resources data, a single Department may be associated with many different Employees. Joining two tables effectively using many-to-many connection one must create another table which combines information from both tables. This may be at some expense in terms of the time it takes to compute the join.

Much of the work in database-systems has been aimed at efficient implementation of joins, because relational systems commonly call for joins, yet face difficulties in optimizing their efficient execution.

Three fundamental algorithms for performing a JOIN type operations exist: nested loop join that may be a simple algorithm that joins two sets by using two nested loops; sort-merge join that may be an algorithm to first sort the relations by the join attribute, so that interleaved linear scans will encounter these sets at the same time; and hash join that may be an algorithm performed by hashing one data set into memory based on join columns and reading the other one and probing the hash table for matches.

The problem with the known databases being split into numerous tables forming a logical hierarchy, may be that in order to obtain, as a result, logically related data, a query must traverse different tables in order to obtain the requested information.

Additionally, executing database queries to a normalized database typically requires time consuming retrieval of stored data from multiple normalized tables. The normalized database therefore needs to locate and retrieve the requested tables and then join the information from the tables in order to respond to the initial data request.

Further, the drawbacks of the known query optimization in normalized databases include for example increased memory and CPU requirements and difficulties in formulating complex queries.

The JOIN type queries reduce database performance by slowing down the processing and by placing stress on computer hardware. Normalized databases need more CPU, memory, and I/O to process transactions and queries than unnormalized and denormalized databases. In existing databases, the JOIN type queries incur significant overhead.

Therefore it may be advantageous to improve data drilling processes and make such processes independent of a hierarchy of a database, because up to now such data drilling processes have been hardcoded in end-user software, such as Business Intelligence (BI) database software, Enterprise Resource Planning (ERP) database software and Customer Relationship Management (CRM) database software, and any new request of a client that desires some new way of data drilling, presently requires end-user's software update and extensive work on the side of database software provider.

Creating a Business Intelligence or Data Discovering processes requires analysis and accurate determination of the beginning, the middle and the end of the analysis process (within limited dimensions). This applies to query building and its constraints.

In the known systems, building a query requires knowledge of the structures of each relational database system parts. Further, it requires Long time processing of large data sets with heterogeneous size of in-between data structures (JOIN operations). Lastly, any new request results in a modification of already developed systems and the need to create new filters requires the knowledge of the query language.

A pre-grant publication number US 20040139102 A1, entitled "Parameterized database drill-through," ('102) discloses a database interface for generating drill-through paths for various data cubes, derived from different report generating applications may be. The interface comprises: (a) means for accepting a request from a user for data; (b) means for translating the request into a drill-through path selected from a plurality of possible drill-through paths between a source and a target; (c) means for applying one or more parameters to the selected drill-rough path to produce a valid drill-through path and to transfer the requested data over the valid drill-through path to an application; and (d) display means for displaying the requested data to the user.

The '102 publication relates to data drilling but requires upfront definition of paths used by the respective queries and execution of such queries in full for a given path comprising numerous data structures along the start to end path. Implementation of the solution of '102 in another database requires a fundamental update of software and redefinition of the model as well as paths of respective queries and in the end generation of new queries and new options within the software operated by end users.

In the '102 solution, in case there may be some error at any place of the path, the end result will be erroneous and the user will have no knowledge of what caused the error and where the error has happened. Typically, complex queries will have to be re-executed in order to debug the query or the database. The error in a complex cross-querying situation will only be apparent, in prior art solutions, when the full processing path has been executed.

Taking into account the foregoing prior art, there may be a need to design and implement an efficient database hierarchy-independent data drilling process. In particular, such optimization shall be aimed at increasing data retrieval performance and shall alleviate the need of an end-to-end design of a data drilling JOIN type query.

Up to now, such problems have been addressed with a use of more powerful hardware, such as database servers having higher processing performance and more memory, instead of solutions related to design of the databases.

SUMMARY

Briefly, computer implemented methods for database hierarch-independent data drilling are presented including: a. selecting one of at least two database structures each having data, where the at least two database structures include, at least two distinct paths that lead from a first of the at least two database structures to a second of the at least two database structures, where a path logically relates at least two data structures which are otherwise directly unrelated using data structures and data structures' relations, and a database information schema that provides information about the at least two database structures including information regarding relations between data structures; b. setting the selected database structure as a current data drilling state; c. finding at least one related data structure corresponding with the selected database structure for the current data drilling state utilizing the database information schema; d. selecting at least one object from the selected database structure; e. selecting at least one related data structure; f. querying the at least one related data structure using the selected object as a parameter; and g. obtaining the query results from the querying. In some embodiments, methods further include: h. setting the at least one related data structure as the current data drilling state; and i. iteratively executing steps (c) to (g) for the current data drilling state until at least one of the two distinct paths has been data drilled. In some embodiments, the at least two database structures include a data table In some embodiments, the finding at least one related data structures utilizes a primary key and a foreign key defined in the database information schema. In some embodiments, the finding at least one related data structures, includes the steps of: listing all foreign keys from the database information schema; selecting only those foreign keys from the listing where the primary key of the selected table is present, where if a selected foreign key is a primary key of the selected table, then the selected table is an intermediate relation table; and retrieving, for each intermediate relation table, from the information schema, all foreign keys and tables to which the selected foreign key refers. In some embodiments, methods further include: outputting all discovered paths to other data tables other than intermediate relation tables; selecting of one of the other data tables; selecting records from the one data table selected; and passing data of the selected records as parameters to queries for records from the one data table selected from the other data tables.

In some embodiments, the database includes: a first data structure stored in a memory, having a definition of at least one data set where each data set includes a data set identifier and logically holds data objects of the same type; a second data structure, stored in the memory, having definitions of properties of objects where each property includes an identifier of the property and an identifier of a set, from the first data structure, the property may be assigned to; a third data structure, stored in the memory, having definitions of objects where each object includes an identifier and an identifier of a set, from the first data structure, the object may be assigned to; a fourth data structure, stored in the memory, having definitions of properties of each object where each property of an object associates a value with an object, from the third data structure, and a property of the set, from the second data structure, the object may be assigned to. In some embodiments, the database further includes: a fifth data structure, stored in the memory, having definitions of relations where each relation includes an identifier of the relation; and a sixth data structure, stored in the memory, for storing definitions of relations between objects where each objects relation associates a relation, from the fifth data structure, to two objects from the third data structure. In some embodiments, the database further includes: a seventh data structure, stored in memory for storing definitions of relations between respective data sets of the at least one data set, where each set relation associates a relation from the fifth data structure and the first data structure. In some embodiments, the first data structure is a set data structure, the second data structure is a column data structure, the third data structure is an object data structure, the fourth data structure is a characteristics data structure, the fifth data structure is a relations data structure, the sixth data structure is an object relations data structure, and the seventh data structure is a set relations data structure. In some embodiments, the finding at least one related data structures includes: finding a currently selected set's id in the first data structure; finding identifiers of sets related to the selected set's id in the seventh data structure; and determining identifiers of sets related to the selected set's id in the seventh data structure.

In other embodiments, computing device program products for database hierarchy-independent data drilling using a computing device are presented, the computing device program product including: a non-transitory computer readable medium; a. first programmatic instructions for selecting one of at least two database structures each having data, where the at least two database structures include, at least two distinct paths that lead from a first of the at least two database structures to a second of the at least two database structures, where a path logically relates at least two data structures which are otherwise directly unrelated using data structures and data structures' relations, and a database information schema that provides information about the at least two database structures including information regarding relations between data structures; b. second programmatic instructions for setting the selected database structure as a current data drilling state; c. third programmatic instructions for finding at least one related data structure corresponding with the selected database structure for the current data drilling state utilizing the database information schema; d. fourth programmatic instructions for selecting at least one object from the selected database structure; e. fifth programmatic instructions for selecting at least one related data structure; f. sixth programmatic instructions for querying the at least one related data structure using the selected object as a parameter; and g. seventh programmatic instructions for obtaining the query results from the querying. In some embodiments, methods further include: h. eighth programmatic instructions for setting the at least one related data structure as the current data drilling state; and i. iteratively executing steps (c) to (g) for the current data drilling state until at least one of the two distinct paths has been data drilled.

BRIEF DESCRIPTION OF FIGURES

These and other features presented herein are accomplished by providing computer-implemented methods for database hierarchy-independent data drilling. Further details and features of the present disclosure, its nature and various advantages will become more apparent from the following detailed description of the embodiments shown in a drawing, in which.

NOTATION AND NOMENCLATURE

It may be to be noted that the term "structure" in the present description, depending on the context, refers either to a data structure existing in computer's memory or a logical structure that may be at times spread among different structures in computer's memory. A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

DESCRIPTION OF EMBODIMENTS

Figure 1:
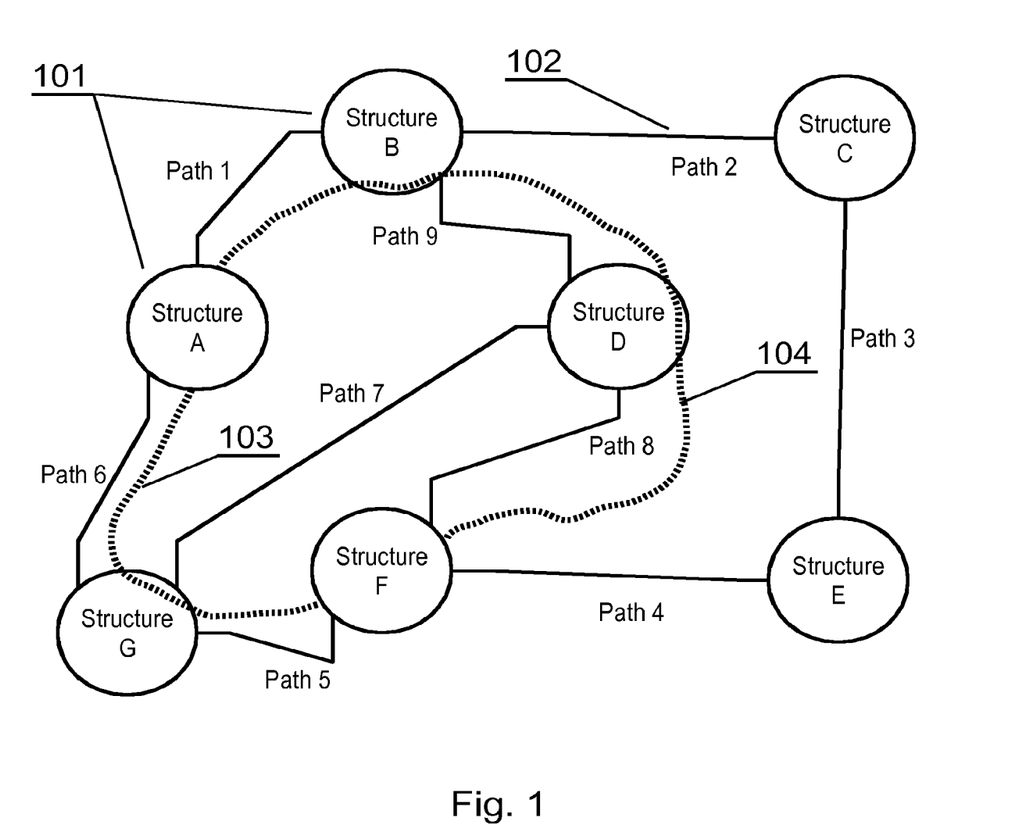
FIG. 1 presents an example of a logical database structure.

FIG. 1 presents an example of a logical database structure. The database comprises structures 101 and paths 102. A structure may be typically in, but not limited to, a tabular form, having defined columns and rows. A path creating a logical connection between structures may be called a relation. For such a relation, a database typically creates a relation intermediate table.

The logical structure of a database may be typically defined in a DBMS (a Database Management System) with a use of a special language, for example a DDL (a Data Description Language). The internal database structure may be defined as metadata (this term refers to "data about data") in a so-called information schema. In relational databases, the information schema may be data that provides information about all of the tables and/or views and/or columns and/or procedures in a database. This set of data may be database-dependent and its accessing methods are usually database-dependent. It may be however common for a database to provide such structure and access to it.

In FIG. 1, path 103 crosses from structure A, via G to structure F, which may be otherwise directly unrelated to the structure A. A user may start at database; then, for example, select a row of interest in a table forming the structure A; drill data further from structure A to structure G; and similarly further, having selected data from structure G, drill data to structure F. For instance, structure A may provide data on companies, structure G on employees and structure F on cars.

Having said that, in modern databases there exist numerous paths to relate objects from a first structure with objects from a second structure. For example, path 103 relates data from structure A with data of structure F. At the same time, it may be possible to relate data entries from structure A with data entries of structure F by way of path 104.

Modern databases provide for hundreds of structures which may be logically linked by thousands of such paths. It may be inefficient and cumbersome for a provider of software for a given database to support thousands of different data drilling scenarios. In practice, typically data drilling scenarios which are requested by a client using the software, will be implemented in the software.

Data drilling may proceed downwards in a logical structure, may proceed upwards, and/or may proceed through, for example on similar levels and/or different paths. Such data drilling may in principle become a never-ending possibility of exploring available information, because a user may keep drilling data without having to stop. Hence, in complex structures it may be difficult to define a next structure as a parent or as a child structure. Typically a next structure may be a related structure. Thus it is irrelevant whether it may be a parent or a child structure. In some cases, the fact that data from a given structure may be treated as parent or a child in relation to some other data, may only be visible to a user who interprets the data in a given state and context of current search.

The methods embodying features of the present invention obviate the need to use cross querying using JOIN queries. A cross query for path 103 involves joining 3 tables, but in practice there are cases where dozens of tables have to be eventually joined. This may be a very complex computational effort. Methods embodying features of the present invention may be make data drilling simpler and independent from the logical database hierarchy structure.

Figure 2:
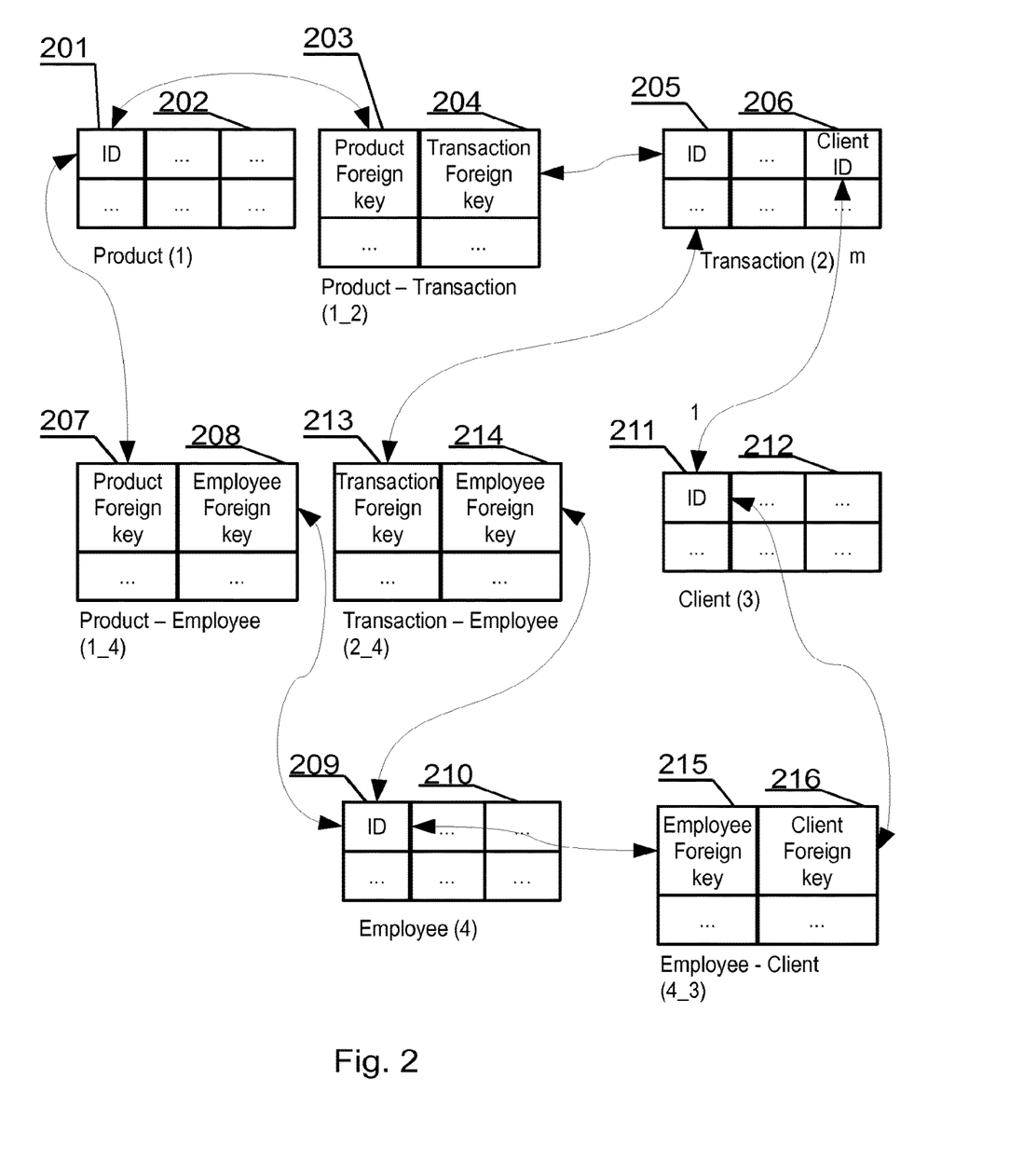
FIG. 2 illustrates an exemplary relational database.

FIG. 2 shows an exemplary relational database and, in turn, its logical layout. Relational databases use keys. Keys are a vital part of a relational database and of the structure of a table. Keys ensure that each record within a table can be uniquely identified and also help identifying relationships between the tables. In an embodiment, there are typically two main types of database keys: primary keys and foreign keys.

Table (1)—Product (1), has primary key column ID 201 and some other columns 202. Table (2)—Transaction (2), has primary key column ID 205, foreign key client-id 206 and some other columns. Table (3)—Client (3), has primary key column ID 211 and some other columns 212. Table (4)—Employee (4), has a primary key column ID 209 and some other columns 210.

These four structures (tables in this example) hold data and are logically related by means of relations. Such relation in a real database system may be implemented by means of an intermediary relation table that provides mapping between elements of each table. In the presented example there are four intermediary relation tables i.e. Product—Transaction (1_2), Product—Employee (1_4), Transaction—Employee (2_4) and Employee—Client (4_3).

The Product—Transaction (1_2) intermediary relation table provides mapping using two foreign keys. The first foreign key 203 may be also a primary key 201 of the products table (1). The other foreign key 204 may be also primary key 205 of the transactions table (2). Similar to this example, other relations are established as shown in FIG. 2.

Figure 3:
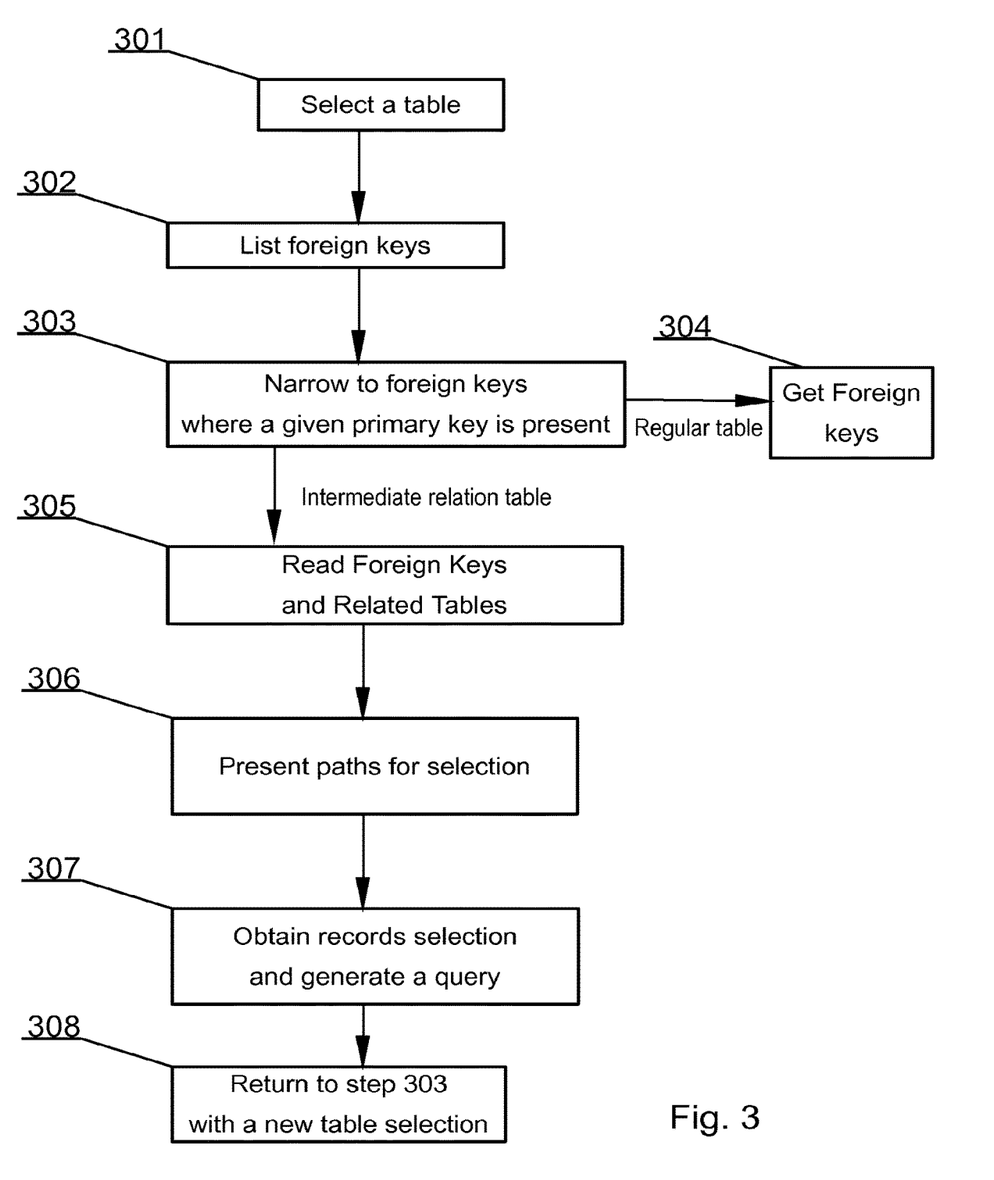
FIG. 3 illustrates a method for exploring database information schema.

FIG. 3 shows a method for exploring database information schema. In an embodiment, this method may find structures directly related to a selected structure or find a plurality of all structures and paths of a given database. In large databases this process may take a significant amount of time to execute, since multi-level recurrences may be applied to find all logical relations.

For example, a selected structure may be structure B in FIG. 1, the method finds existing paths 1, 2 and 9 and directly related structures A, C and D.

In an exemplary implementation, the method starts at step 301 by selecting a table. A starting table may be selected by using a query to list all tables of a database from the database information schema. For example, such table may be the Products table (1) from the database shown in FIG. 2.

Next, the process moves to step 302, where all foreign keys from the database information schema are listed. These foreign keys are narrowed, at step 303, to only those foreign keys where the primary key of the table selected at step 301 may be present. This means that tables Product—Transaction (1_2) and Product—Employee (1_4) from FIG. 2 may be identified since the foreign keys 203, 207 present in these tables are also primary key 201 in the Products (1) table.

The process of step 302 may be implemented with a database query that will return from the database information schema all foreign keys, which refer to a given table. In the present example information will be retrieved that a product refers to Product_Transaction (1_2) table and Product_Employee (1_4) table to a column of some name.

If a returned foreign key, from step 303, may be a primary key of the respective result table, it means that the table may be an intermediate relation table. In such case the process shall advance to step 305. Otherwise, the process shall advance to step 304.

At step 304 the method identifies that there may be a table related to the table selected in step 301, but that it may not be a many-to-many relation. This may be the case with transactions (2) table and clients (3) table in FIG. 2. The determination of such relation may be also a path in logical database structure. For the table selected at step 301, there are listed at step 304 the table's foreign keys. The primary keys are addressed in the remaining steps of the method.

At step 305 for each intermediate relation table there are to be retrieved, from the information schema, all foreign keys and tables to which these foreign keys refer.

At step 306, the discovered paths to other data tables (not intermediary relation tables) are presented for selection, for example by end user. At this point, a user may be presented with data drilling options for the current place in the logical structure of the given database. For example, the user of the database shown in FIG. 2 may drill data to Transaction (2) or Employee (4).

Further, at step 307, records selection may be obtained from table selected at step 301, and data of these records are passed as parameters to queries listing records from tables selected for further data drilling, the further data drilling tables being selected from options available at step 306.

In an exemplary scenario, as a result, a user may obtain all transactions where selected product has been sold or purchased. Alternatively, using the example of FIG. 2, all employees who have selected a particular product may be identified as a result of such data drilling query.

At Step 308, the process returns to step 303 to select a may be newly accessed table, for example transactions or employees table found in the preceding iteration of the process.

The process may be executed once to explore all structure dependencies in the database or may be executed for a particular database data structure (such as a database table).

The process shown in FIG. 3 allows for unlimited data drilling, which may occur in loops, paths, onwards, backwards without a need to stop unless a user wishes so.

Figure 4:
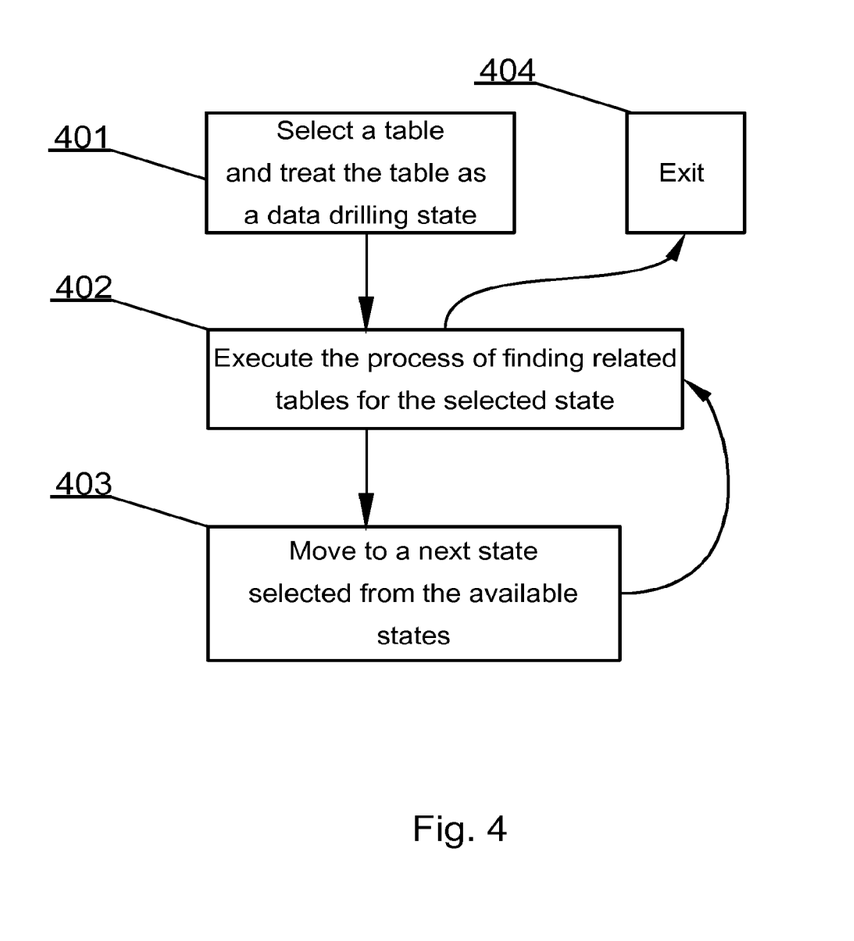
FIG. 4 illustrates a method for data drilling.

As shown in FIG. 4, at a higher level the database hierarchy-independent data drilling method may be defined in few steps. The process starts at step 401 by selecting a table (or, more generally, a data structure) and treating the table as a data drilling state.

The logical structure of a database may be treated as a map of states. This approach may be disclosed, for example, in a co-pending European Patent Application number EP13461516.0 by the same Applicant, entitled "Computer-implemented method for storing unlimited amount of data as a mind map in relational database systems," filed on Mar. 29 2013, and incorporated herein by reference in its entirety. A map of tables and relations may be represented as a mind map. In such an arrangement a table may be represented by a node of the map and relations between nodes are represented as branches on the mind map. Treating data structures as states of a database system, allows for joining states and defining how different states relate and how to transition between pairs of states.

At step 402 of the process, related tables (structures) are identified for the selected state. In an example, such a process may be the process disclosed with reference to FIG. 3. Execution of this step finds tables that are related to the selected table and ways that particular pairs of tables are related.

In an exemplary embodiment, the system receives, as parameters, records (i.e. at least one record) of the selected table for use as parameters for finding records in the related table that relate to records of the selected table. In an embodiment, the records will be selected by a user via a graphical user interface displaying the records for selection. A record may in a broader sense be defined as an object of a database data structure.

When parameters for finding records in the related table are set, may be the database may be queried and results are obtained followed by designating the related table as the selected table, as for example, by moving to a next state selected from the available states at step 403.

Step 403 proceeds to step 402 that may be executed again for the currently selected table. Data drilling according to the present invention may be performed as navigating between different states (i.e. data structures, for example database tables) irrespective of their relation and hierarchy.

Upon conclusion of data drilling or a sequence of data drilling steps a user may exit the process at step 404.

The system presented herein may be useful in databases based on mind maps such as a database disclosed in the co-pending European Patent Application number EP13461516.0 by the same Applicant, which may be hereby incorporated in its entirety by reference. In that particular database type disclosed it may be especially easy to execute a process of finding related tables because, a relation present in the SETS RELATIONS data structure, may be directly mapping to a branch between two nodes of a mind map.

One aspect to be noted here may be that the SETS RELATIONS structure may be a description of different connections, which have their representation between selected objects that may be facilitated by the OBJECTS RELATIONS data structure. This data structure may be designed to provide a mapping between a relation from the RELATIONS data structure and two objects selected from the OBJECTS data structure.

By using the process of endless data drilling on the aforementioned structure, one may notice, that an arbitrary change of state may be always executed in the same way.

Use of information from the RELATIONS data structure provides knowledge on directions in which one may fork or branch. Thanks to the fact that normalized OBJECTS data structure does not require modifications and may be uniform, for each query it significantly reduces algorithmic complexity of the process and allows therefore transitions, using the same set of functions, between an endless number of states.

In an embodiment, when executing advanced querying involving crossing states, an operator of the system obtains improved control over the data drilling process owing the fact that it may be possible to execute additional filtering inside a state and then advance to the next state, which returns more reliable results and decreases the risk of error that may be frequently present in JOIN type queries.

Figure 5:
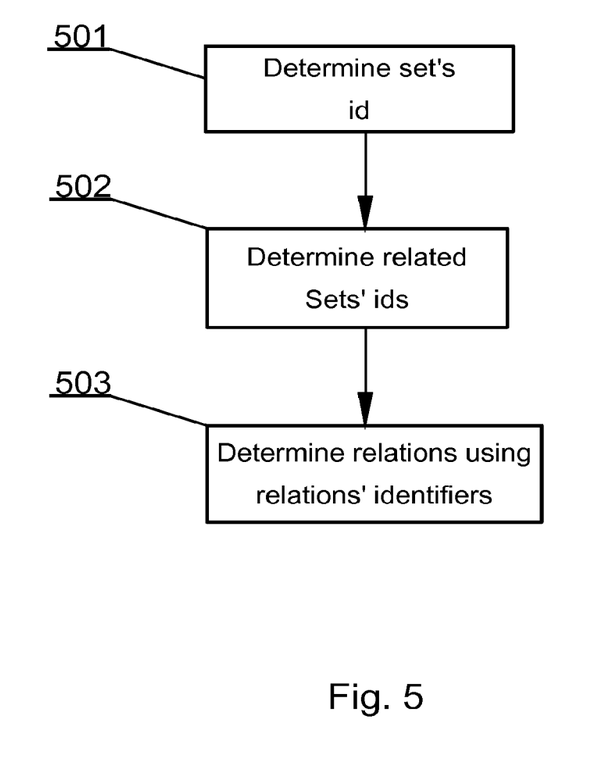
FIG. 5 illustrates a method for exploring logical database structure in a mind-map-type database.

In the mind-map-type database, the process of step 402 comprises a simple, yet efficient process shown in details in FIG. 5. The process starts at step 501 from finding a currently selected set's id in the first data structure (see FIGS. 6 and 7). Then, at step 502, there are found identifiers of sets related to the selected set's id in the seventh data structure (see FIGS. 6 and 7). The process ends at step 503 by identifying relations, between the sets, in the fifth data structure (see FIGS. 6 and 7) using relations identifiers from the seventh data structure.

As can be seen in the mind-map-type database, database hierarchy-independent data drilling may be much more efficient than in traditional relational databases. In particular the process of determining relation types and related data structures may be much simpler and require little computational resources for its execution. Nevertheless, database hierarchy-independent data drilling may as well be implemented in traditional relational databases.

Endlessly deep data drilling allows for finding information that may not be obtained with JOIN type queries. Until a certain level a JOIN type query may be feasible, for example level 20. However, when level 200 is considered or cyclic loop within a given data structure, a prediction of a result and query execution in a traditional way may be impossible.

A person executing the data drilling may decide ad-hoc regarding change of query concept at the time of result visualization. This in turn may lead to results, for which a query cannot be predicted in advance.

Automatic algorithms for searching in graphs (i.e. depth-first search (DFS)) allow for similar transitions but may be limited to single objects from the OBJECT structure.

According to the present disclosure, in particular when applying the solution according to the EP13461516.0, from each state, comprising from 1 to infinity of elements, there may be made a transition to a next state comprising from 1 to infinity of elements.

Further, the present disclosure may not be, in contrast to DFS, limited to a root because each state may be directly available and automatically becomes a root of a query. Additionally, by extending DFS there may be executed multiple database queries simultaneously using already obtained results of previous state(s). In DFS there may be stored a path of arrival to a given element, however according to the present disclosure there may be stored a method of obtaining results in a given state—because each state may be created with a use of an appropriate query, which may be repeatable, there may not be required memorizing of all results but a method of acquiring these results from a given state, which in case of long data drilling may be more resource efficient.

The present disclosure thus includes a database hierarchy-independent data drilling. Knowledge of structures of each relational system parts may not be needed. Further, there may be a significantly better control of cross-querying by the possibility of branching the query during execution. Additionally, there may not be any need to understand the query language. Another advantage may be that there may not be required any knowledge how a particular system should look like in the future. The design of the system may be not constrained (the system may be easily expandable, restructured and reconfigured).

The following section of the specification presents an embodiment of the Applicant's co-pending European Patent Application number EP13461516.0.

Figure 6:
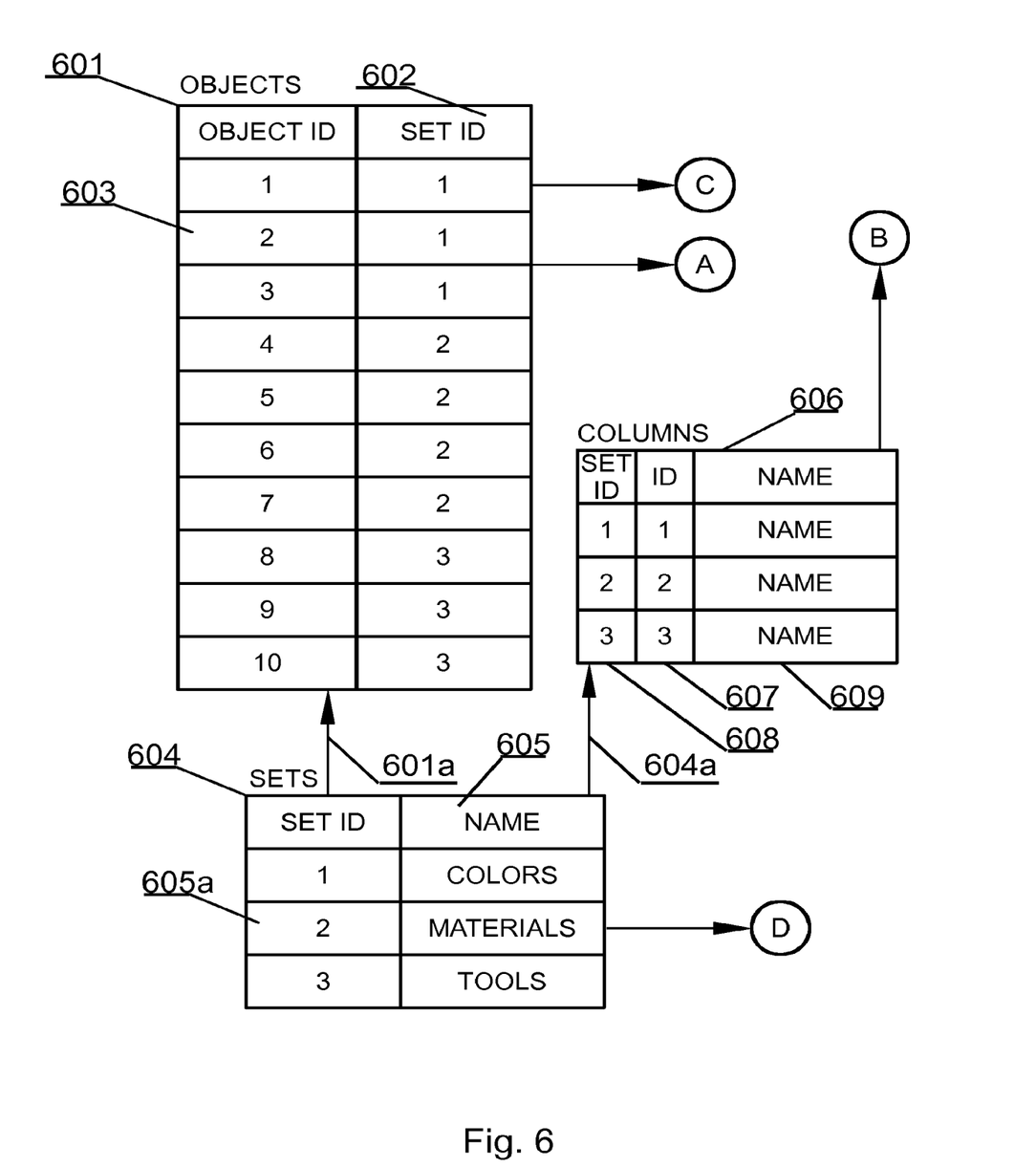
FIGS. 6 and 7 illustrate a mind-map type database system.

FIG. 6, corresponding to FIG. 2 of the co-pending application, shows a new database system according to the present disclosure. In order to cooperate with mind maps the database system according to the present disclosure has been designed differently than known database systems. In an embodiment, the database system comprises six core sets of data and optional sets. The core sets comprise SETS, OBJECTS, COLUMNS, CHARACTERISTICS, RELATIONS and OBJECTS RELATIONS. It has to be noted that the names above are exemplary only and the respective core sets are defined rather by their function within the system than their name.

The first set of data or first data structure may be called SETS 604, because it may be used to logically hold data related to sets of data. The sets of data may be represented on a mind map as nodes. Each entry in the SETS data structure 604 comprises at least a unique identifier 605a and preferably also its name 605. In particular, there are three SETS, namely COLORS having ID of 1, MATERIALS having ID of 2 and TOOLS having ID of 3. The SETS data structure may be a top level structure and does not refer to other data structures but other data structures refer to it as identified by respective arrows between the sets of FIG. 6.

Each set of data is, as in the real world, characterized by some properties typically called columns. Hence, the second set of data or second data structure may be called COLUMNS 606. A property, called typically a column, may be uniquely identified with an identifier ID 607 and may be associated with a set, defined in the SETS data structure 604, by means of an identifier herein called SET ID 608. A column also preferably may be associated with a name 609. As indicated by an arrow 604*a*, the COLUMNS data structure logically, directly references the SETS data structure, because it uses the identifiers of sets. If for example each color of the set called COLORS had another property, say RGB value, there could be added an entry comprising the following values: '1', '4', 'RGB'. At this level of the system the types of respective data such as text, integer, binary large object (BLOB) are not considered as their application in the present system may be routine work.

Having defined data structures of SETS and COLUMNS there may be defined objects that will form elements of respective SETS and will have properties defined by the COLUMNS data structure. Objects are held in the OBJECTS 601 data structure. This third data structure holds entries uniquely identified with an identifier ID 603 and associated with a set, defined in the SETS data structure 604, by means of an identifier herein called SET ID 602. As indicated by an arrow 601*a*, the OBJECTS data structure logically, directly references the SETS data structure, because it uses the identifiers of sets.

The fourth core data structure may be a fourth data structure that holds data entries of each property of each object. This data structure has been called CHARACTERISTICS 701 in FIG. 7. This may be one of fundamental differences from all known databases where there are rows of data that comprise entries for all columns of a data table. In the present disclosure each property of an object may be stored as a separate entry, which greatly improves scalability of the system and allows for example adding objects properties in real time.

Figure 7:
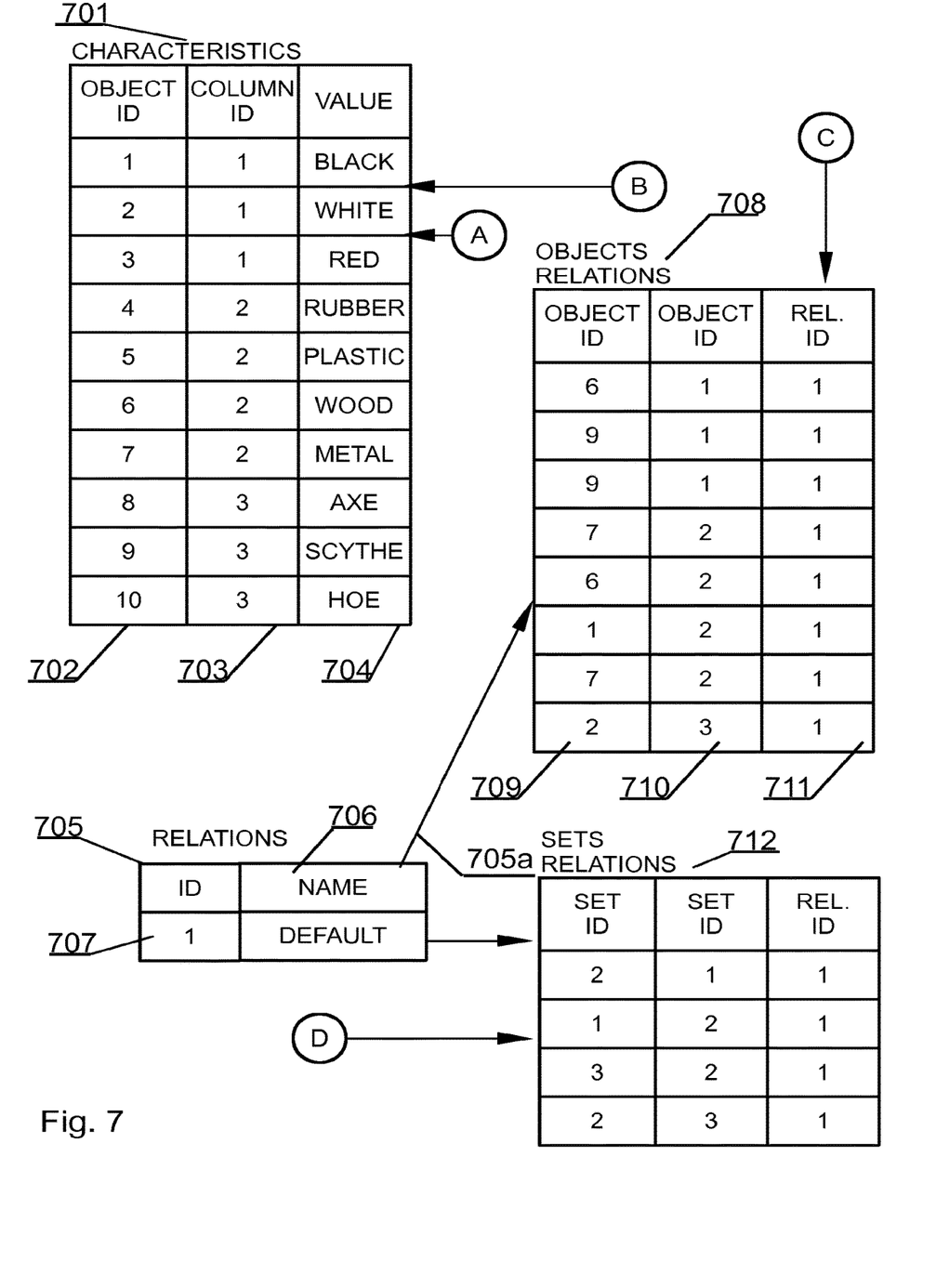

The CHARACTERISTICS 701 data structure holds entries uniquely identified with an identifier OBJECT ID 702 and may be associated with a property, defined in the COLUMNS data structure 606, by means of an identifier herein called COLUMNID 703. Further each entry in the CHARACTERISTICS data structure, comprises a value of the given property of the particular object. As indicated by respective arrows originating from sources A and B, the CHARACTERISTICS data structure 701 logically, directly references the COLUMNS data structure and the OBJECTS data structure, because it uses the identifiers from the respective data structures.

The fifth core data structure, of the databases system according to the present disclosure, may be designed to hold data regarding relations present in the database. This data structure has been called herein RELATIONS 705. This may be a very simple structure and comprises an identifier of a relation ID 707 and in an embodiment, also holds the textual description of the relation i.e. a NAME 706. As indicated by an arrow 705*a*, the RELATIONS data structure logically, directly references downwards the OBJECTS RELATIONS data structure, because the OBJECTS RELATIONS use the identifiers of the relations.

An additional (or sixth) core data structure of the present disclosure may be the mentioned OBJECTS RELATIONS data structure 708. In an embodiment, this data may be provides mapping between a relation from the RELATIONS data structure 705 and two objects from the OBJECTS data structure 701. For example the first entry in the OBJECTS RELATIONS data structure 708 defines that the relation having identifier of 1 exists between object having an identifier of 1 and the object having an identifier of 6.

Optionally a seventh data structure exists in the database system of the present disclosure. This data structure holds data regarding relations between the respective data sets and in FIG. 7 may be called SETS RELATIONS 712. This data structure may be designed to provide mapping between a relation from the RELATIONS data structure 705 and two sets from the SETS data structure 604. For example, the first entry in the SETS RELATIONS data structure 712 defines that the relation having identifier of 1 exists between a set having an identifier of 1 and a set having an identifier of 2. Providing an entry in the SETS RELATION data structure 712 between a set having an identifier of 1 and a set having an identifier of 2 as well as between a set having an identifier of 2 and a set having an identifier of 1, allows for creating a bidirectional relation.

There may be also a possibility of self referencing from a given set. For example such case may be present when there may be a set of persons and there exists a student-teacher relation between persons assigned to a particular set.

As described, for example a relational database system of a hundred tables will in the present system be stored in the six above-described data structures. Naturally, most of the data will be kept in the OBJECTS and CHARACTERISTICS data structures.

It can be easily recognized, by one skilled in the art, that the aforementioned computer-implemented method for database hierarchy-independent data drilling may be performed and/or controlled by one or more computer programs. Such computer programs are typically executed by utilizing the computing resources in a computing device such as personal computers, personal digital assistants, cellular telephones, receivers and decoders of digital television or the like. Applications are stored in non-volatile memory, for example a flash memory or volatile memory, for example RAM and are executed by a processor. These memories are exemplary recording media for storing computer programs comprising computer-executable instructions performing all the steps of the computer-implemented method according the technical concept presented herein.

While the concepts presented herein have been depicted, described, and have been defined with reference to particular preferred embodiments, such references and examples of implementation in the foregoing specification do not imply any limitation on those concepts. It will, however, be evident that various modifications and changes may be made thereto without departing from the broader scope of the technical concept. The presented embodiments are exemplary only, and are not exhaustive of the scope of the technical concept presented herein.

Accordingly, the scope of protection may not be limited to the embodiments described in the specification, but may be only limited by the claims that follow.

What is claimed is:

1. A computer implemented method for database hierarchy-independent data drilling comprising:
   (a) accessing a database comprising:
   (1) a first data structure comprising definitions of at least two data sets, wherein a definition of a data set comprises an identifier of the data set and a name of the data set, wherein the identifier is uniquely associated with the name and wherein the name is not a parent or child of the identifier,
   (2) a second data structure comprising definitions of relations of the at least two data sets, wherein a definition of a relation comprises a unique identifier of the relation and a name of the relation, wherein a relation is a type of logical path between two data sets, and wherein the name of the relation is not a parent or child of the identifier of the relation, and (3) a third data structure comprising definitions of set relations between the at least two data sets, wherein a definition of a set relation associates a unique identifier of a relation, from the second data structure, to the respective identifiers of two data sets from the first data structure, wherein a given row of the third data structure comprises the two identifiers of the two data sets from the first data structure, and wherein the two data sets from the first data structure are not a parent or child of the unique identifier of the relation, wherein all data sets in the first data structure are hierarchy independent such that a set relation is capable of associating a unique identifier of a relation to the respective identifiers of any two data sets of all of the data sets;

(b) setting a selected identifier from the first data structure as a current data drilling state;

(c) presenting one or more data sets related to the current data drilling state to a user on a graphical user interface, wherein the one or more data sets related to the current data drilling state are identified by identifying definitions of set relations comprising the selected identifier using the third data structure, wherein the one or more data sets include a second data set;

(d) receiving, from the user, a selection of the second data set from the one or more data sets; and (e) using the definitions of the relations in the second data structure to identify a hierarchy-independent relation between the current data drilling state and the second data set.

2. The method of claim 1, further comprising iteratively executing (c) to (e) for the current data drilling state until the logical path linking the start data set and an end data set has been data drilled.

3. The method of claim 1, further comprising:
outputting all discovered paths to data tables on the graphical user interface;
selecting a first data table;
selecting records from the first data table; and
passing data of the selected records as parameters to queries for records from a second data table.

4. The method of claim 1, wherein the database further comprises:
a fourth data structure, comprising definitions of data properties of the at least two data sets, —wherein a definition of a data property includes an identifier of the data property, an identifier of the data set from the first data structure, and a data property name;
a fifth data structure, comprising definitions of data objects of the at least two data sets, wherein a definition of a data object includes a unique data object identifier and an identifier of the data set from the first data structure; and
a sixth data structure, comprising definitions of data object values, wherein a definition of a data object value comprises (i) the data object value, (ii) a data object identifier from the fifth data structure, and (iii) a data property identifier from the fourth data structure.

5. The method of claim 4, wherein the database further comprises:
a seventh data structure comprising definitions of relations between objects, wherein a definition of each object relation associates a relation from the second data structure to the respective data object identifiers of two data objects from the fifth data structure.

6. The method of claim 1, further comprising using the logical path, retrieving the second data set and setting the second data set as the current data drilling state.

7. A non-transitory computer-readable medium comprising machine-executable code that, upon execution by a computer, implements a method for data hierarchy-independent data drilling, the method comprising:
(a) accessing a database comprising:
(1) a first data structure comprising definitions of at least two data sets, wherein a definition of a data set comprises an identifier of the data set and a name of the data set, wherein the name is a name of the unique set identifier and the set name is not a parent or a child of the identifier,
(2) a second data structure comprising definitions of relations of the at least two data sets, wherein a definition of a relation comprises a unique identifier of the relation and a name of the relation, and wherein a relation is a type of logical path between two data sets, and wherein the name of the relation is not a parent or child of the identifier of the relation and
(3) a third data structure comprising definitions of set relations between the at least two data sets, wherein a definition of a set relation associates a unique identifier of a relation, from the second data structure, to the respective identifiers of two data sets from the first data structure, wherein a given row of the third data structure comprises the two identifiers of the two data sets from the first data structure, and wherein the two data sets from the first data structure are not a parent or child of the unique identifier of the relation, wherein all data sets in the first data structure are hierarchy independent such that a set relation is capable of associating a unique identifier of a relation to the respective identifiers of any two data sets of all of the data sets;

(b) setting a selected identifier from the first data structure as a current data drilling state;

(c) presenting one or more data sets related to the current data drilling state to a user on a graphical user interface, wherein the one or more data sets related to the current data drilling state are identified by identifying definitions of set relations comprising the selected identifier using the third data structure, wherein the one or more data sets include a second data set;

(d) receiving, from the user, a selection of the second data set from the one or more data sets; and (e) using the definitions of the relations in the second data structure to identify a hierarchy-independent relation between the current data drilling state and the second data set.

8. The medium of claim 7, further comprising iteratively executing (c) to (e) for the current data drilling state until the logical path linking the start data set and an end data set has been data drilled.

9. The medium of claim 7, further comprising:
outputting all discovered paths to data tables on the graphical user interface;
selecting a first data table;
selecting records from the first data table; and
passing data of the selected records as parameters to queries for records from a second data table.

10. The medium of claim 7, wherein the database further comprises:
a fourth data structure, comprising definitions of data properties of the at least two data sets, wherein a definition of a data property includes an identifier of the data property, an identifier from the first data structure, and a data property name;

a fifth data structure, comprising definitions of data objects of the at least two data sets, wherein a definition of a data object includes a unique data object identifier and an identifier of the data set from the first data structure; and a sixth data structure, comprising definitions of data object values, wherein a definition of a data object value comprises (i) the data object value, (ii) a data object identifier from the fifth data structure, and (iii) a data property identifier from the fourth data structure.

11. The medium of claim 10, wherein the database further comprises:

a seventh data structure comprising definitions of relations between objects, wherein a definition of each object relation associates a relation from the second data structure to the respective data object identifiers of two data objects from the fifth data structure.

12. The medium of claim 7, further comprising using the logical path, retrieving the second data set and setting the second data set as the current data drilling state.

* * * * *